(12) United States Patent
Onota et al.

(10) Patent No.: US 7,955,503 B2
(45) Date of Patent: Jun. 7, 2011

(54) PURE WATER PRODUCING APPARATUS

(75) Inventors: Seiichi Onota, Tokyo (JP); Masayuki Miwa, Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 851 days.

(21) Appl. No.: 11/885,960

(22) PCT Filed: Mar. 10, 2006

(86) PCT No.: PCT/JP2006/304709
§ 371 (c)(1),
(2), (4) Date: Sep. 20, 2007

(87) PCT Pub. No.: WO2006/100937
PCT Pub. Date: Sep. 28, 2006

(65) Prior Publication Data
US 2008/0156710 A1 Jul. 3, 2008

(30) Foreign Application Priority Data
Mar. 18, 2005 (JP) .................. 2005-079700
Mar. 18, 2005 (JP) .................. 2005-079701

(51) Int. Cl.
*C02F 1/44* (2006.01)
(52) U.S. Cl. ................ 210/321.65; 210/96.1; 210/134; 210/137; 210/149; 210/243; 210/258; 210/259; 210/416.1; 204/632
(58) Field of Classification Search .................. 210/900; 204/519, 632
See application file for complete search history.

(56) References Cited

U.S. PATENT DOCUMENTS

| 2005/0103717 A1* | 5/2005 | Jha et al. .................. 210/652 |
| 2005/0103722 A1* | 5/2005 | Freydina et al. ............ 210/746 |

FOREIGN PATENT DOCUMENTS

| JP | S61-107906 | 5/1986 |
| JP | S63-270592 | 11/1988 |
| JP | H05-018870 | 1/1993 |
| JP | H08-229554 | 9/1996 |
| JP | H11-244863 | 9/1999 |
| JP | 2000-74865 | 3/2000 |
| JP | 2000-317457 | 11/2000 |
| JP | 2001-029752 | 2/2001 |
| JP | 2003-001259 | 1/2003 |
| JP | 2003-157869 | 5/2003 |
| JP | 2004-057935 | 2/2004 |

* cited by examiner

*Primary Examiner* — Duane Smith
*Assistant Examiner* — Paul J. Durand
(74) *Attorney, Agent, or Firm* — Manabu Kanesaka

(57) ABSTRACT

A pure water producing apparatus prevents fluctuations in the amount of produced pure water without requiring a heat exchanger. Raw water is filtered with an activated carbon filtration device, sent through a water supply pump to the reverse osmosis device, and demineralized. Demineralized water output from the reverse osmosis device contacts a water quality sensor including a water temperature sensor, is sent to an electrodeionization device, and subjected to electrodeionization. Water subjected to electrodeionization contacts a water quality sensor having a water temperature sensor, and is taken out as treated water. A sensing signal output from the water temperature sensor is input to a pump control circuit to control an amount of the water supplied from the pump so that an amount of water passing through the reverse osmosis device is maintained constant.

3 Claims, 1 Drawing Sheet

000# PURE WATER PRODUCING APPARATUS

TECHNICAL FIELD

The present invention relates to a pure water producing apparatus, and in particular, to a pure water producing apparatus for treating raw water with a reverse osmosis device and an electrodeionization device.

BACKGROUND ART

Various systems for treating industrial water, urban water, well water, and water recycled in a semiconductor manufacturing process, and the like to produce pure water are known, including an apparatus for treating raw water with a reverse osmosis device and subsequently with an electrodeionization device (e.g., see, Patent Documents 1 and 2).

Patent Document 1: Japanese Unexamined Patent Application Publication No. 2003-1259
Patent Document 2: Japanese Unexamined Patent Application Publication No. 2001-29752

In the pure water producing apparatus for treating raw water with the reverse osmosis device and the electrodeionization device to produce pure water, fluctuations in the temperature of water to be treated with the reverse osmosis device or the electrodeionization device causes fluctuations in the amount of water passed through the reverse osmosis device or deionized water output from the electrodeionization device, and accordingly an amount of pure water produced by the pure water producing apparatus fluctuates.

To prevent the fluctuations in the amount of water due to the fluctuations in the temperature of water, a heat exchanger has been installed at the upstream side of the reverse osmosis device to keep a temperature of water flowing-into the reverse osmosis device constant. However, installation of the heat exchanger increases an equipment cost of the pure water producing apparatus.

In the pure water producing apparatus for treating raw water with the reverse osmosis device and the electrodeionization device to produce pure water, the fluctuations in the temperature of water to be treated with the electrodeionization device causes fluctuations in the quality of treated water output from the electrodeionization device.

To prevent the fluctuations in the quality of treated water due to the fluctuations in the temperature of water, a heat exchanger has been installed at the upstream side of the electrodeionization device to keep a temperature of water flowing into the electrodeionization device constant. However, installation of the heat exchanger increases an equipment cost of the pure water producing apparatus.

SUMMARY OF INVENTION

A first object of the present invention is to provide a pure water producing apparatus capable of preventing fluctuations in the amount of produced pure water without requiring installation of a heat exchanger.

A second object of the present invention is to provide a pure water producing apparatus capable of preventing fluctuations in the quality of produced pure water without requiring installation of a heat exchanger.

In a first aspect of the present invention, the pure water producing apparatus for treating raw water with a reverse osmosis device and subsequently with an electrodeionization device to produce pure water is characterized by comprising sensing means that senses a temperature of water passed through the reverse osmosis device and controlling means that controls an amount of water supplied to the reverse osmosis device on the basis of the water temperature sensed by the sensing means so that an amount of water passed through the reverse osmosis device is kept constant.

In a second aspect of the present invention, the pure water producing apparatus for treating raw water with a reverse osmosis device and subsequently with an electrodeionization device to produce pure water is characterized by comprising sensing means that senses a temperature of deionized water output from the electrodeionization device and controlling means that controls an amount of water supplied to the electrodeionization device on the basis of the water temperature sensed by the sensing means so that an amount of deionized water output from the electrodeionization device is kept constant.

In a third aspect of the present invention, the pure water producing apparatus for treating raw water with a reverse osmosis device and subsequently with an electrodeionization device to produce pure water is characterized by comprising sensing means that senses a temperature of raw water, intermediate water, or produced pure water and controlling means that controls an applied voltage and/or an energizing current supplied to the electrodeionization device on the basis of the water temperature sensed by the sensing means so that quality of produced pure water is kept constant.

In the present invention, the sensing means that senses a water temperature may also be used as a sensor for temperature correction of a conductivity meter or specific resistance meter.

DETAILED DESCRIPTION OF THE INVENTION

The pure water producing apparatus of the first or second aspect senses a temperature of water passed through the reverse osmosis device or deionized water output from the electrodeionization device, controls an amount of water supplied to the reverse osmosis device or electrodeionization device on the basis of the sensed temperature, and thereby keeps an amount of water passed through the reverse osmosis device constant. By thus controlling the amount of water supplied to the reverse osmosis device, the fluctuations in the amount of water passed through the reverse osmosis device or deionized water output from the electrodeionization device can be prevented, and consequently the fluctuations in the amount of pure water produced can be prevented. The pure water producing apparatus therefore does not need to be installed with a heat exchanger at the upstream side of the reverse osmosis device, and thus an equipment cost thereof is decreased.

The pure water producing apparatus of the third aspect senses a temperature of raw water, intermediate water, or produced pure water, controls an applied voltage and/or an energizing current supplied to the electrodeionization device on the basis of the sensed temperature, and thereby keeps quality of the pure water produced constant. By thus controlling the applied voltage and/or the energizing current supplied to the electrodeionization device, the fluctuations in the quality of pure water can be prevented. The pure water producing apparatus therefore does not need to be installed with a heat exchanger at the upstream side of the electrodeionization device, and thus an equipment cost thereof is decreased.

Use of a sensor for temperature correction of a conductivity meter or specific resistance meter used in sensing quality of water passed through the reverse osmosis device or deionized water output from the electrodeionization device as the sensing means that senses a water temperature can further decrease the equipment cost.

Figure 1:
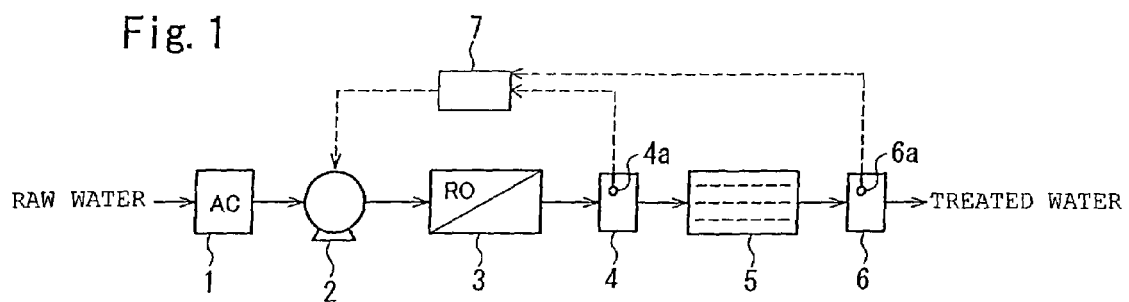
FIG. 1 is a schematic diagram showing an embodiment of the pure water producing apparatus of the present invention.

Embodiments will be described below with reference to drawings. FIG. 1 shows a schematic diagram of the pure water producing apparatus according to embodiments of the first and the second aspects.

Raw water is filtered with an activated carbon filtration device 1, sent through a water supply pump 2 for a reverse osmosis device (in FIG. 1, denoted as RO) to the reverse osmosis device 3, and demineralized. Demineralized water output from the reverse osmosis device 3 contacts with a water quality sensor 4 including a water temperature sensor 4a, is sent to an electrodeionization device 5, and subjected to electrodeionization. Water subjected to electrodeionization contacts a water quality sensor 6 having a water temperature sensor 6a, and is taken out as treated water (pure water).

In the control method of the first aspect, a sensing signal from the water temperature sensor 4a is input to a pump control circuit 7 to control an amount of water supplied from the pump 2 so that the fluctuations in the amount of water passed through the reverse osmosis device by the fluctuations in the temperature of water is prevented. The pump 2 is controlled with, for example, an inverter.

As described above, the pure water producing apparatus is designed to prevent the fluctuations in the amount of demineralized water by sensing a temperature of the demineralized water output from the reverse osmosis device 3 with the water temperature sensor 4a and controlling an amount of water supplied from the pump 2 on the basis of the temperature. According to the pure water producing apparatus, since the fluctuations in the amount of demineralized water can be prevented without a heat exchanger, the fluctuations in the amount of produced pure water can be securely prevented, and an equipment cost of the pure water producing apparatus is relatively low.

In the control method of the second aspect, a sensing signal from the water temperature sensor 6a is input to the pump control circuit 7 to control an amount of water supplied from the pump 2 so that the fluctuations in the amount of deionized water output from the electrodeionization device 5 caused by the fluctuations in the temperature of water is prevented.

As described above, the pure water producing apparatus prevents the fluctuations in the amount of deionized water output from the electrodeionization device 5 by controlling an amount of water supplied to the electrodeionization device 5 on the basis of a temperature sensed by the water temperature sensor 6a, and thus a heat exchanger at the upstream side of the electrodeionization device 5 is not necessary, and an equipment cost thereof is decreased.

In the embodiments, since the water temperature sensors 4a and 6a for temperature correction of the water quality sensors 4 and 6 are used as the water temperature sensors, there is no need to additionally provide water temperature sensors, and an equipment cost thereof can be further decrease.

Figure 2:
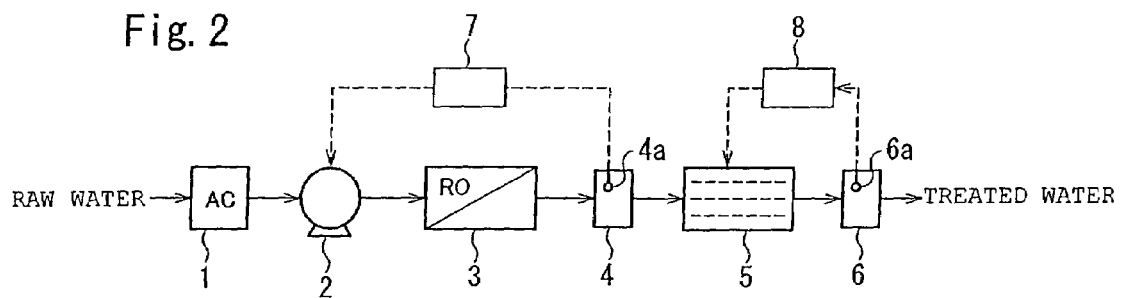
FIG. 2 is a schematic diagram showing an embodiment of the pure water producing apparatus of the present invention.

FIG. 2 shows a schematic diagram of the pure water producing apparatus according to the embodiment of the third aspect.

Similarly in FIG. 1, raw water is filtered with an activated carbon filtration device 1, sent through a water supply pump 2 for a reverse osmosis device (RO) to the reverse osmosis device 3, and demineralized. Demineralized water output from the reverse osmosis device 3 contacts a water quality sensor 4 including a water temperature sensor 4a, is sent to an electrodeionization device 5, and subjected to electrodeionization. Water subjected to electrodeionization contacts a water quality sensor 6 having a water temperature sensor 6a, and is taken out as treated water (pure water).

A sensing signal output from the water temperature sensor 4a is input to a pump control circuit 7 to control an amount of water supplied from the pump 2 so that the amount of water passed through the reverse osmosis device 3 is kept constant even when a water temperature varies.

In the third aspect, a sensing signal output from the water temperature sensor 6a is input to a current control circuit 8 for the electrodeionization device to control an applied voltage and/or an energizing current supplied to the electrodeionization device 5 so that a conductivity or specific resistance of the treated water from the electrodeionization device 5 is constant. More specifically, when the water temperature is decreased, the applied voltage and/or an energizing current supplied to the electrodeionization device 5 is increased, and when the water temperature is increased, the applied voltage and/or an energizing current to the electrodeionization device 5 is decreased, and thereby a conductivity or specific resistance of the water passed through the electrodeionization device 5 is kept constant.

As described above, the pure water producing apparatus prevents the fluctuations in the quality of treated water output from the electrodeionization device 5 by controlling the applied voltage and/or the energizing current supplied to the electrodeionization device 5 on the basis of a temperature sensed by the water temperature sensor 6a, and thus is not required to be installed with a heat exchanger at the upstream side of the electrodeionization device D, and thus an equipment cost thereof can be decreased.

In this embodiment, the pure water producing apparatus is designed to prevent the fluctuations in the amount of demineralized water by sensing a temperature of the demineralized water output from the reverse osmosis device 3 with the water temperature sensor 4a and controlling an amount of water supplied from the pump 2 on the basis of the temperature. The fluctuations in the amount of pure water produced with the pure water producing apparatus can therefore be prevented.

Also in this embodiment, since the water temperature sensors 4a and 6a for temperature correction of the water quality sensors 4 and 6 are used as the water temperature sensors, there is no need to additionally provide water temperature sensors, which also results in an equipment cost of the pure water producing apparatus being further decreased.

In the present invention, intended raw water to be treated includes industrial water, urban water, well water, and water recycled in manufacturing processes such as washing wastewater in semiconductor and liquid crystal manufacturing processes. The raw water may be a mixture of two or more of the above. In the case in which raw water is water to be recycled in a manufacturing process such as water to be recycled in a semiconductor manufacturing process, when a concentration of organic matter (TOC) in the water to be recycled is high, the water to be recycled may be pretreated with a TOC removing device such as biological treating means, heating means, and catalytic decomposing means.

The raw water such as industrial water, urban water, and well water is preferably pretreated with the activated carbon filtration device 1 and the like according to need as in the embodiment. Devices other than the activated carbon filtration device may be used, including an ultrafiltration (UF) device and a microfiltration (MF) device.

The raw water or pretreated water thereof (or water subjected to a TOC removal treatment) may be combined with a mineral acid such as HCl and $H_2SO_4$ to adjust its pH to 4 to 6, and treated with a deoxygenation device.

The pH adjustment is performed to remove carbon dioxide gas together with oxygen, which reduces a load on the demineralizing device downstream. As the deoxygenation device, a membrane deaeration device, a vacuum deaeration device, an air gas deaeration device, and the like may be used. When the raw water is acidified to acidic pH to be subjected to deoxygenation with the deoxygenation device, an alkali such as NaOH is added to the water to adjust its pH to 7 to 8.

A membrane of the reverse osmosis device has no specific limitation. Membranes of polysulfone, polyamide, polyvinyl acetate and the like can be used.

A device including a cathode compartment having a cathode, an anode compartment having an anode, and concentrating compartments and desalting compartments alternately formed between the anode compartment and the cathode compartment by alternately arranging anion-exchange membranes and cation-exchange membranes, in which the demineralizing compartments are each filled with an ion-exchanger such as a mixed resin of anion- and cation-exchange resins and ion-exchange fibers is can be used as the electrodeionization device 5. An applied voltage to the electrodeionization device 5 is preferably about 10 to 100 V, and particularly about 30 to 70 V. An energizing current density therein is preferably about 4 to 20 $A/m^2$, and particularly about 6 to 10 $A/m^2$.

Deionized water output from the electrodeionization device 5 may be treated with an additional reverse osmosis device and an ultrafiltration device (not shown) according to need to further remove trace amounts of remaining TOC, silica, and the like, in order to increase its purity.

In the present invention, concentrated water from the electrodeionization device 5 is preferably returned to the inlet side of the reverse osmosis device 3 and repeatedly treated to enhance water recovery. In this case, since water supplied to the electrodeionization device 5 quality enhanced by the treatment through the reverse osmosis device 3, there is no problem of reduction in quality of treated water by returning concentrated water from the electrodeionization device to the inlet side of the reverse osmosis device 3.

In the present invention, amounts of water flowing through pipes may be controlled by controlling opening of valves, or may be adjusted (set) by providing orifices to the pipes.

The invention claimed is:

1. A pure water producing apparatus for treating raw water, comprising:
   a filtration device receiving the raw water,
   a water supply pump connected to the filtration device and receiving the raw water,
   a reverse osmosis device attached to the water supply pump and treating the raw water supplied from the water supply pump,
   a first water quality sensor including a first water temperature sensor, through which the raw water from the reverse osmosis device passes,
   an electrodeionization device attached to the first water quality sensor, through which the raw water passes to produce pure water,
   a second water quality sensor including a second water temperature sensor, through which the pure water passes, and
   a controlling device connected to the first and second water temperature sensors, the controlling device controlling at least one of an amount of water supplied to the reverse osmosis device and an amount of water supplied to the electrodeionization device on a basis of the first and second water temperature sensors so that at least one of an amount of water passing through the reverse osmosis device, an amount of deionized water output from the electrodeionization device, and quality of produced pure water is maintained constant.

2. A pure water producing apparatus for treating raw water, comprising:
   a filtration device receiving the raw water,
   a water supply pump connected to the filtration device and receiving the raw water,
   a reverse osmosis device attached to the water supply pump and treating the raw water supplied from the water supply pump,
   a first water quality sensor including a first water temperature sensor, through which the raw water from the reverse osmosis device passes,
   an electrodeionization device attached to the first water quality sensor, through which the raw water passes to produce pure water,
   a second water quality sensor including a second water temperature sensor, through which the pure water passes,
   a first controlling device connected between the first water temperature sensor and the water supply pump to control such that an amount of water passing through the reverse osmosis device is kept constant even when a water temperature changes, and
   a second controlling device connected between the second water temperature sensor and the electrodeionization device, the second controlling device controlling at least one of a voltage and an energizing current supplied to the electrodeionization device on a basis of the second water temperature sensor so that at least one of a conductivity and specific resistance of treated water from the electrodeionization device is constant to keep quality of produced pure water constant.

3. The pure water producing apparatus according to claim 2, wherein the first and second water temperature devices are also used as a sensor for temperature correction of a conductivity meter or specific resistance meter.

* * * * *